United States Patent
Lechlitner et al.

(10) Patent No.: US 11,505,175 B2
(45) Date of Patent: Nov. 22, 2022

(54) SYSTEMS AND METHODS FOR MANAGING TEMPERATURE OF AN ELECTRIC MACHINE OF A HYBRID ELECTRIC VEHICLE

(71) Applicant: Ford Global Technologies, LLC, Dearborn, MI (US)

(72) Inventors: Craig Lechlitner, Belleville, MI (US); Lucas Kizer, Dundee, MI (US); Carol Louise Okubo, Dearborn, MI (US); Bryan Whitney D Belt, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 16/707,291

(22) Filed: Dec. 9, 2019

(65) Prior Publication Data

US 2021/0171009 A1    Jun. 10, 2021

(51) Int. Cl.
| | | |
|---|---|---|
| *B60W 20/10* | (2016.01) | |
| *F02D 41/02* | (2006.01) | |
| *B60W 10/06* | (2006.01) | |
| *B60W 10/08* | (2006.01) | |

(52) U.S. Cl.
CPC ............ *B60W 20/10* (2013.01); *B60W 10/06* (2013.01); *B60W 10/08* (2013.01); *F02D 41/0205* (2013.01); *B60W 2510/0666* (2013.01); *B60W 2510/087* (2013.01); *B60W 2710/0644* (2013.01); *B60W 2710/0666* (2013.01); *B60W 2720/30* (2013.01)

(58) Field of Classification Search
CPC ...... B60W 20/10; B60W 10/06; B60W 10/08; B60W 2510/0666; B60W 2510/087; B60W 2710/0644; B60W 2710/0666; B60W 2720/30; B60W 2520/10; B60W 30/1843; B60W 2540/10; B60W 2710/0605; B60W 2710/0677; B60W 2710/083; B60W 20/15; B60W 30/1882; F02D 41/0205; F02D 41/221; B60K 6/445; Y02T 10/62

See application file for complete search history.

(56) References Cited

U.S. PATENT DOCUMENTS

| | | | |
|---|---|---|---|
| 9,809,105 B1* | 11/2017 | Janson | F16H 48/08 |
| 10,322,712 B2 | 6/2019 | Miller et al. | |
| 2008/0000700 A1* | 1/2008 | Kotani | B60K 6/365 |
| | | | 123/436 |
| 2008/0149407 A1* | 6/2008 | Shibata | B60W 10/115 |
| | | | 477/3 |
| 2009/0082154 A1* | 3/2009 | Iwase | B60W 10/06 |
| | | | 903/945 |
| 2009/0118884 A1* | 5/2009 | Heap | B60K 6/547 |
| | | | 180/65.285 |

(Continued)

FOREIGN PATENT DOCUMENTS

KR    20160036032 A    4/2016

*Primary Examiner* — Behrang Badii
(74) *Attorney, Agent, or Firm* — David Kelley; McCoy Russell LLP

(57) ABSTRACT

Methods and systems are provided for operating a driveline of a hybrid vehicle during conditions when a temperature of a motor/generator is increasing. In one example, a method is provided that adjusts engine speed as a function of motor/generator temperature while maintaining engine power output when driver demand wheel power is constant.

14 Claims, 5 Drawing Sheets

(56) References Cited

U.S. PATENT DOCUMENTS

| | | | |
|---|---|---|---|
| 2011/0232980 A1* | 9/2011 | Nomura | B60W 10/08 180/65.265 |
| 2012/0101676 A1* | 4/2012 | Ichioka | B60W 30/02 180/65.265 |
| 2015/0197239 A1* | 7/2015 | Vilar | B60K 6/52 180/65.265 |
| 2019/0283766 A1* | 9/2019 | Jensen | B60W 10/10 |

* cited by examiner

SYSTEMS AND METHODS FOR MANAGING TEMPERATURE OF AN ELECTRIC MACHINE OF A HYBRID ELECTRIC VEHICLE

FIELD

The present description relates generally to methods and systems for managing a temperature of an electric machine. The electric machine may be operated in cooperation with an internal combustion engine to meet a requested driver demand power.

BACKGROUND/SUMMARY

Vehicle powertrain systems may include one or more electric machines to propel a vehicle. The electric machines may be operated to solely propel a vehicle, or alternatively, the electric machines may be operated with an engine to propel the vehicle. For example, during high load conditions, output of an engine and output of an electric machine may be combined to meet vehicle driver demand power and/or torque. However, if torque output of the electric machine is high for an extended period of time, a temperature of windings of the electric machine may increase to an undesirable level. Therefore, it may be desirable to regulate the temperature of the electric machine so that the temperature of the electric machine stays within an acceptable or desired range even if the driver demand power and/or torque is at a higher level for an extended period of time.

Accordingly, the inventors herein have developed systems and methods to at least partially address the above-mentioned issues. In one example, a method is provided for operating a vehicle driveline, comprising: adjusting a speed of an engine via a controller from an optimal engine speed to a speed that is less than the optimal engine speed and that is a function of a temperature of a first electric machine.

By adjusting a speed of an engine to a speed that is less than the optimal speed of the engine and that is a function of a temperature of a first electric machine, it may be possible to maintain engine output power while meeting driver demand torque and reducing a temperature of the first electric machine. In particular, the speed of the engine may be reduced and the torque output of the engine may be increased to maintain engine power at a requested engine power that is based on a requested wheel power. In addition, torque output of the first electric machine may be reduced and wheel torque may be maintained, thereby reducing heat that is generated via the first electric machine and a temperature of the first electric machine while maintaining wheel torque. In this way, the temperature of the first electric machine may be regulated without having to store excess power from the engine into electrical power when storage of additional electric power may not be available.

The present system and method may have several advantages. In particular, the present method may allow a driveline to maintain a requested wheel power for an extended period of time without having to store additional excess engine power in the form of electrical energy. Further, the present method may control a temperature of a first electric machine so that windings of the first electric machine have a reduced possibility of degrading. In addition, the present method may allow a full torque capacity of the first electric machine to be available for meeting driver demand requests.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
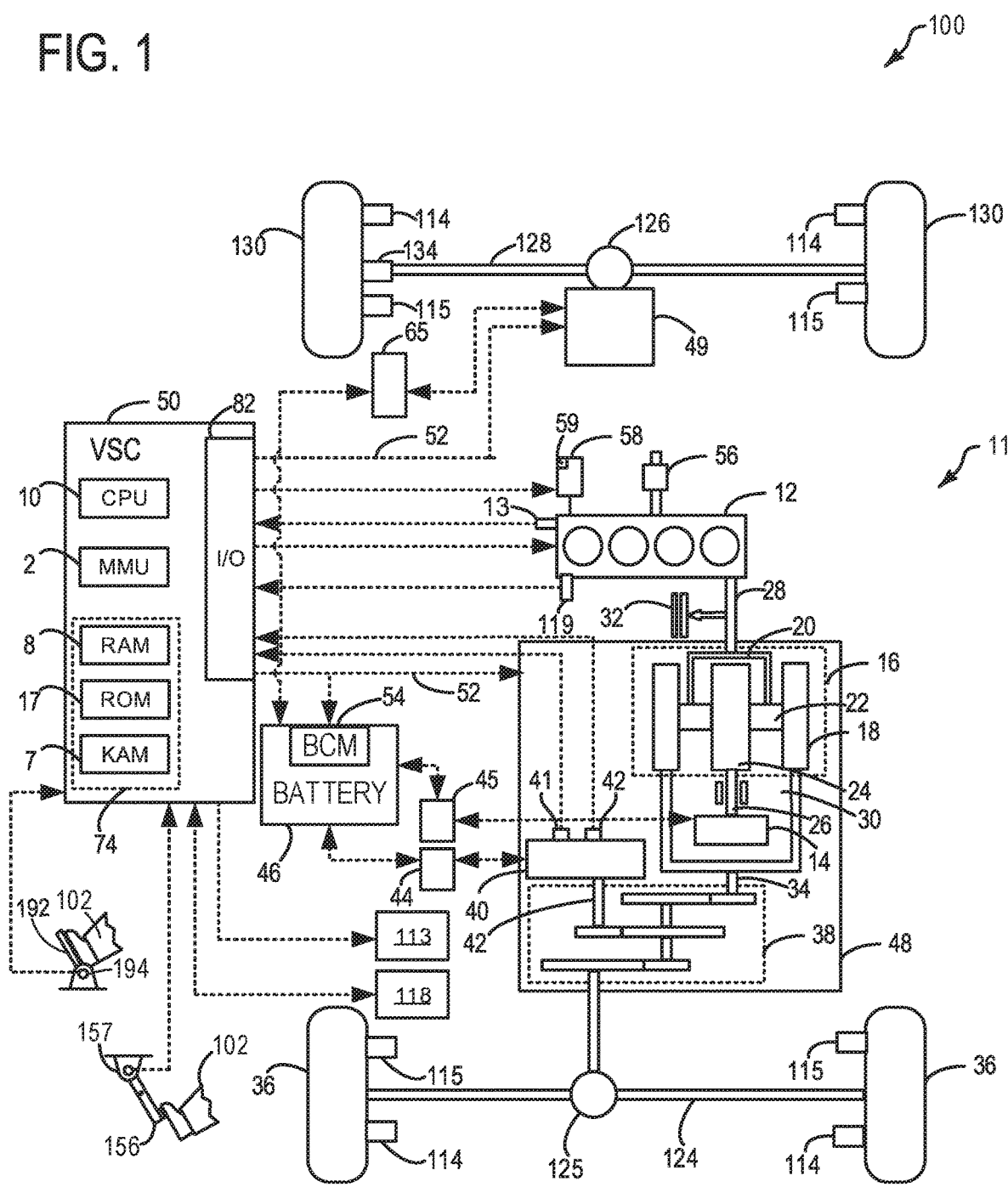
FIG. 1 shows an example powertrain in a hybrid electric vehicle (HEV) system.
Figure 1:
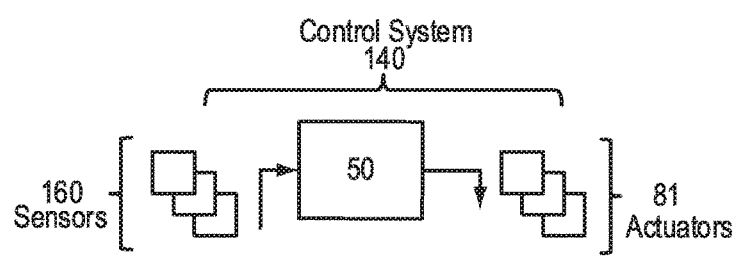
Figure 2:
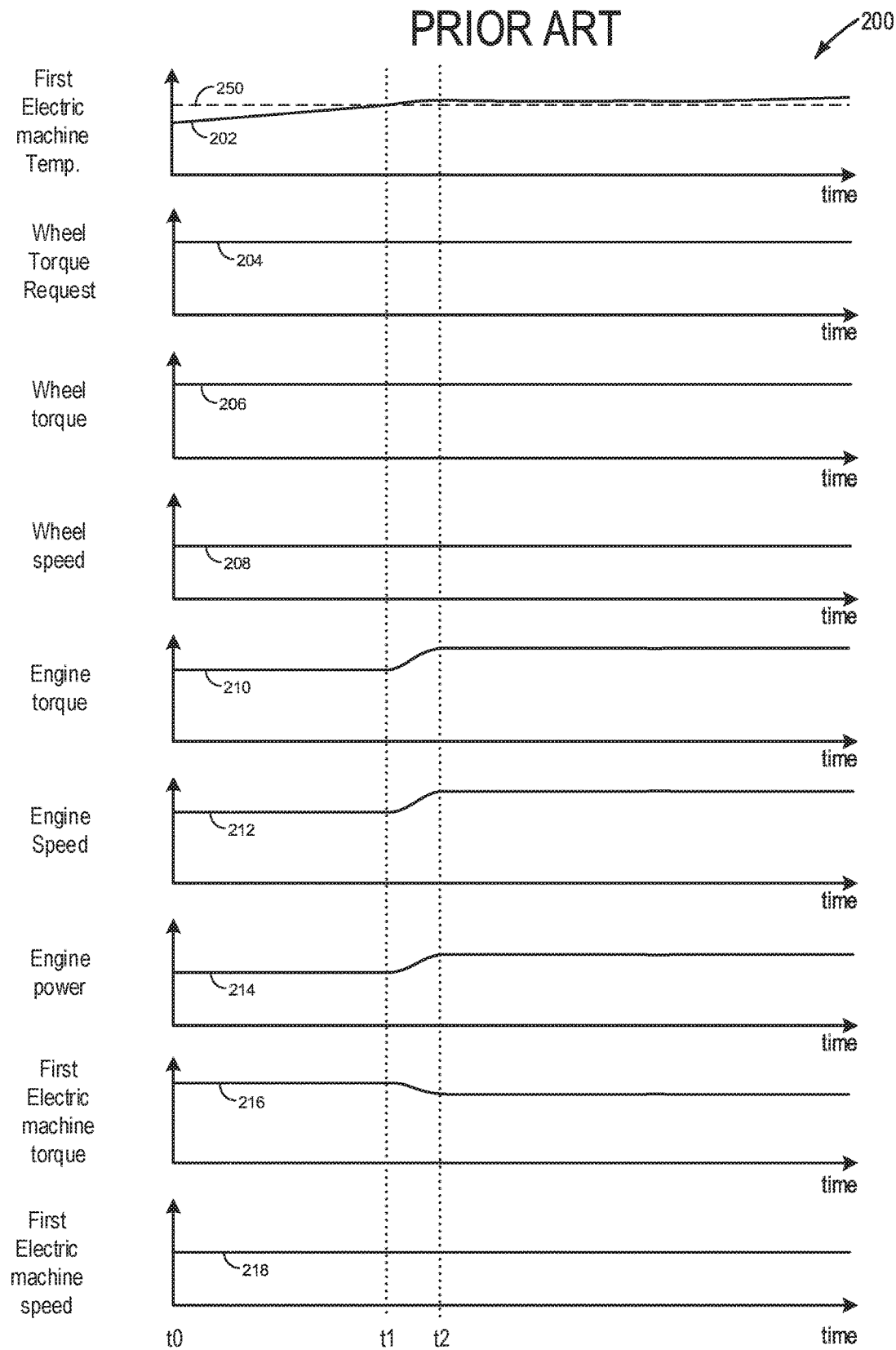
FIG. 2 shows an example prior art hybrid vehicle operating sequence.
Figure 3:
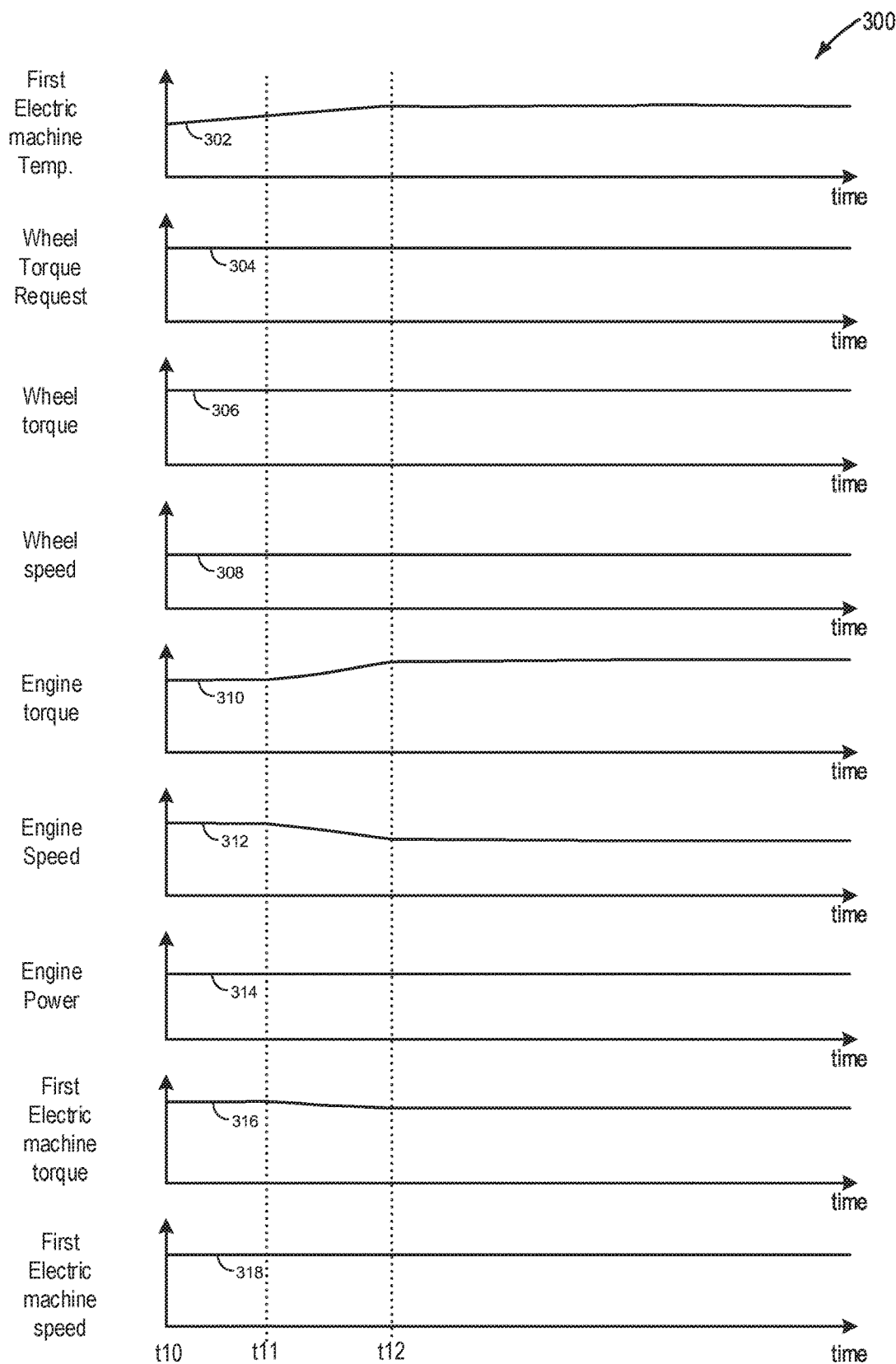
FIG. 3 shows an example operating sequence according to the method of FIG. 5.
Figure 4A:
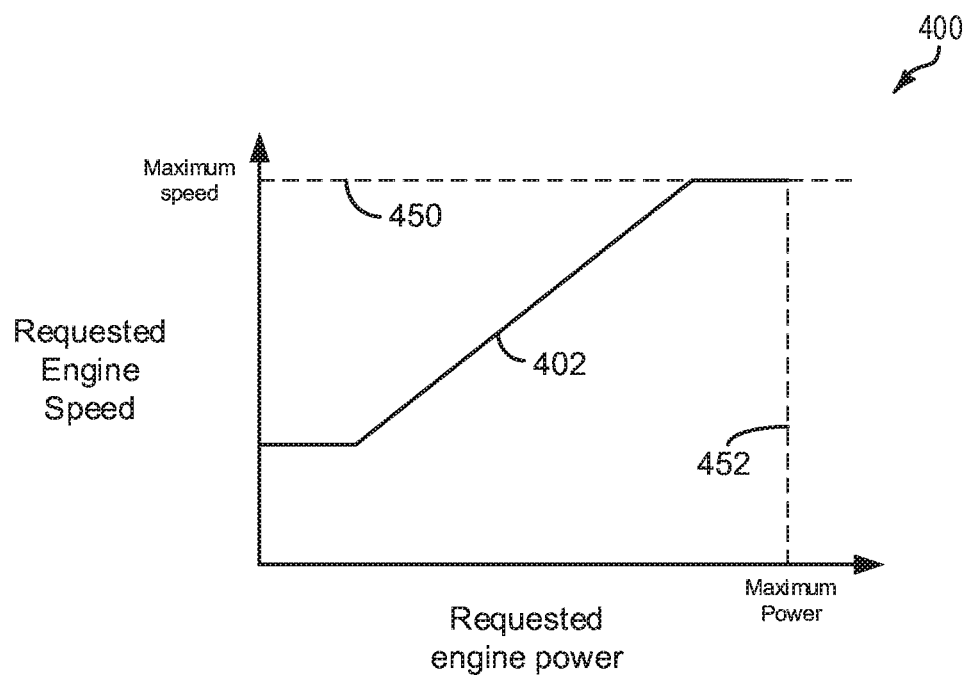
FIG. 4A shows a map or function for determining an optimal engine speed based on a requested or desired engine power.
Figure 4B:
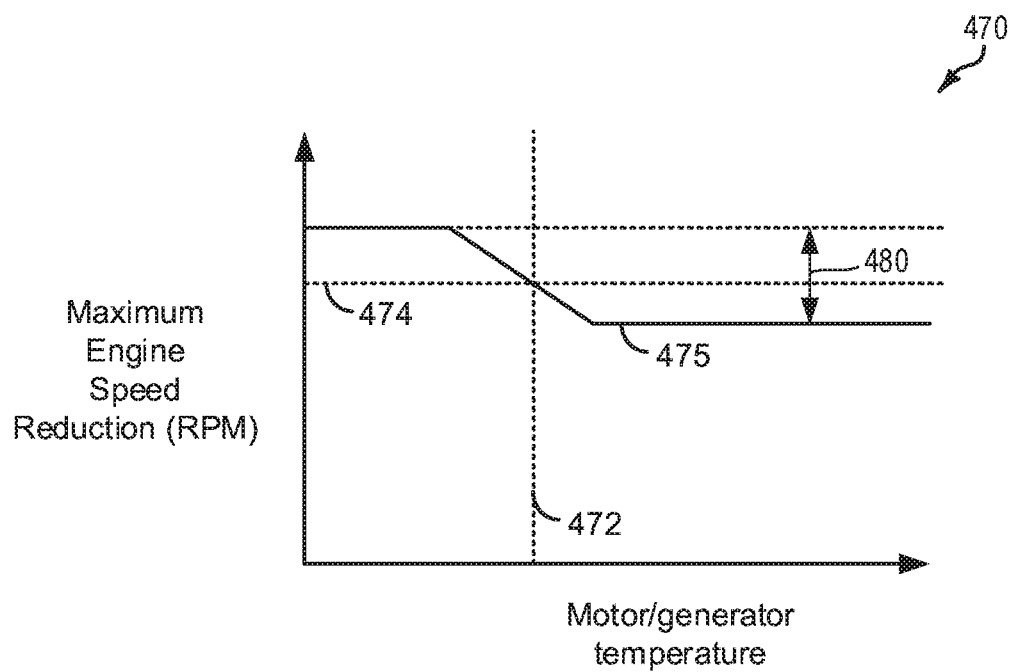
FIG. 4B shows a map or function for determining a maximum engine speed reduction value.
Figure 5:
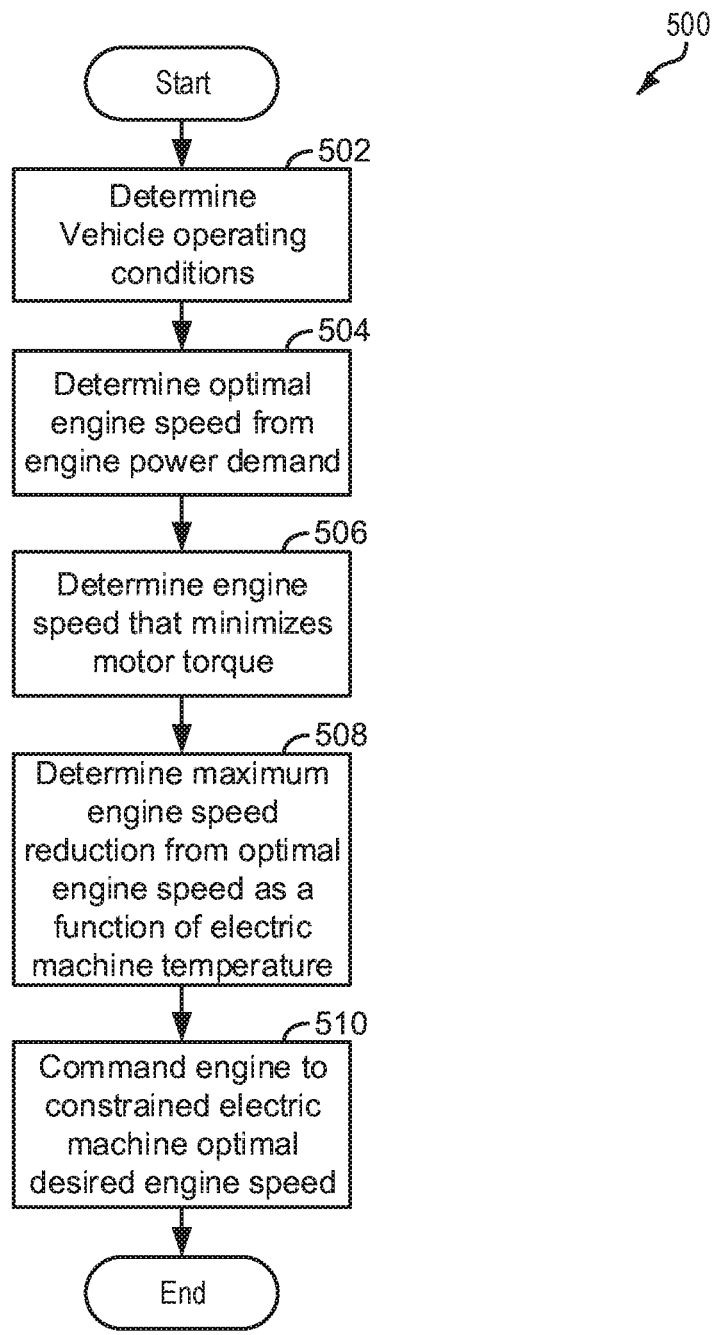
FIG. 5 shows a method for operating a hybrid vehicle.

The following description relates to systems and methods for meeting a requested driver demand power during vehicle operating conditions when temperature of an electric machine may increase. The method may maintain an engine power output while allowing torque of the electric machine to decrease so that temperature of the electric machine may be regulated below a threshold electric machine temperature. By maintaining the engine power output during conditions when electric machine temperature may increase, it may be possible to avoid charging an electric energy storage device at a greater rate than may be desired. Further, maximum motor torque may remain available so that maximum wheel torque may be provided if it is requested. One hybrid system that includes the method described herein is depicted in FIG. 1. A vehicle operating sequence according to a prior art method is shown in FIG. 2. A vehicle operating sequence according to the present method is shown in FIG. 3. An example map for determining an optimal engine speed is shown in FIG. 4A. An example map for determining a maximum engine speed reduction value is shown in FIG. 4B. Finally, a method for operating a hybrid vehicle and regulating a temperature of an electric machine is shown in FIG. 5.

Turning now to the figures, FIG. 1 includes a schematic block diagram representation of a vehicle system 100 to illustrate one embodiment of a system or method for controlling a vehicle powertrain according to the present description. Vehicle system 100 generally represents any vehicle having a conventional or hybrid electric powertrain with an internal combustion engine (ICE) 12. In the depicted example, the vehicle system 100 is a hybrid electric vehicle (HEV) system including an internal combustion engine 12, a battery 46, a first electric machine 40 also referred to herein as first motor/generator 40, a second electric machine 14 also referred to as second motor/generator 14, and a third electric machine 49 also referred to herein as third motor/generator 49. However, it will be appreciated that in alternate embodiments, the torque control methods discussed herein may be applied to other hybrid vehicle configurations without departing from the scope of this disclosure.

The vehicle powertrain 11 includes engine 12 and second electric machine 14 coupled to the engine via a planetary gearset 16. Engine 12 and second electric machine 14 are connected through a power transfer unit or transmission, which in this example is implemented by a planetary gearset 16. As such, other types of power transfer units, including other gearsets and transmissions, may be used to connect engine 12 to second electric machine 14. Planetary gearset 16 includes a ring gear 18, a carrier 20, planet gears 22, and a sun gear 24.

Second electric machine 14 may be used to provide electric current to charge battery 46 or operate first electric machine 40, or third electric machine 49. Alternatively, second electric machine 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from second electric machine 14 to engine 12, a one-way clutch 32 is provided so that shaft 28 rotates in only one direction. In addition, second electric machine 14 can be operated to control the rotational speed of engine 12 via planetary gearset 16 and shaft 28 when and if desired. A speed of engine 12 may be determined via speed sensor 13, which may sense one or more teeth of a crankshaft wheel (not shown). Engine 12 may be directly coupled to planetary gearset 16. Likewise, second electric machine 14 may be directly coupled to planetary gearset 16.

Ring gear 18 is connected to a shaft 34, which is connected to vehicle front wheels 36 through a second gearset 38. Front wheels 36 may be coupled to front axle 124. First electric machine 40 may be used to output torque to shaft 42. In some examples, front axle 124 may include front final drive 125. As mentioned, first electric machine 40 may operate as either a motor or a generator. For example, battery 46 may be configured to power first electric machine 40 and operate it as a motor. Other vehicles within the scope of the present invention may have different electric machine arrangements, such as more or less than the first, second, and third electric machines (e.g. 40, 14 and 49 at FIG. 1, respectively) depicted herein. In the example shown in FIG. 1, both first electric machine 40 and second electric machine 14 may be operated as motors using electric current from battery 46 or another source of electric current to provide a desired output torque. Alternatively, both first electric machine 40 and second electric machine 14 may be operated as generators supplying electrical power to an energy storage device, represented by high voltage battery 46. Other types of energy storage devices and/or output devices that can be used include, for example, a capacitor bank, a fuel cell, a flywheel, etc. Temperature sensor 41 provides an indication of a temperature of first electric machine 40 and speed sensor 42 measures a speed of first electric machine 40.

A first inverter 44 may be used to convert direct current (DC) derived from battery 46 to alternating current (AC) for electric machine 40. First inverter 44 may additionally be used to convert AC current derived from first electric machine 40 to DC for storage in battery 46. Likewise, a second inverter 45 may be used to convert direct current (DC) derived from battery 46 to alternating current (AC) for electric machine 14. Second inverter 45 may additionally be used to convert AC current derived from second electric machine 14 to DC for storage in battery 46. Thus, it may be understood that when first electric machine 40 and/or second electric machine 14 is operated as a motor (as opposed to a generator), DC current derived from the battery 46 may be converted via inverters 44 and/or 45 to AC current to power the first and/or second electric machine(s). Alternatively, when first electric machine 40 and/or second electric machine 14 is operated as a generator (as opposed to a motor), AC current derived from the first and/or second electric machine may be converted via inverters 44 and/or 45 to DC current to increase a state of charge (SOC) of battery 46.

As shown in FIG. 1, first electric machine 40, second electric machine 14, planetary gearset 16, and a portion of second gearset 38 may generally be referred to as a transaxle 48. One or more controllers 50 implemented in hardware and/or software are provided to control engine 12 and the components of transaxle 48. In the example of FIG. 1, controller 50 is a vehicle system controller (VSC). Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as second electric machine 14 and/or first electric machine 40.

Any or all of the various controllers or control modules, such as VSC 50 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 17, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

VSC 50 may comprise a portion of a control system 140. Control system 140 is shown receiving information from a plurality of sensors 160 (various examples of which are described herein) and sending control signals to a plurality of actuators 81 (various examples of which are described herein). Sensors 160 may include but are not limited to voltage and current sensors for each electric machine to determine electric machine current and power. Sensors 160 may also include a manifold pressure sensor to determine engine load, ambient air temperature sensor, temperature sensors for engine 12 and each electric machine, and current and voltage sensors for measuring battery operating conditions. As an example, VSC 50 may receive information from roll stability control sensor 118, which may include a lateral and/or longitudinal and/or yaw rate sensor. As another example, VSC 50 may receive information about how much torque the engine is actually producing via torque sensor 119. Actuators 81 may include but are not limited to engine torque actuators such as fuel injectors, an engine air intake throttle, engine camshafts, and ignition coils.

Vehicle system 100 may also include one or more emission control devices 56. These may include, for example, a carbon canister for collecting fuel vapors to reduce emissions. From time to time, the carbon canister may be purged, such that collected vapors are taken into the engine air intake system and combusted. Emission control device 56 may also include one or more catalysts or catalytic reactors in various configurations to treat exhaust gases of engine 12. In addition to emissions control or device 56, vehicle system 100 may also include one or more engine or motor driven accessories (AC/DC) 58. Since the accessories 58 use torque produced by engine 12 and/or electrical energy from battery 46 and/or electrical machines 14, 40, one or more of the accessories 58 may be selectively controlled by VSC 50 to more accurately control torque production of engine 12 when operating near the combustion stability limit. For example, an air conditioning system may include a compressor 59 whose operation is adjusted by the controller during selected operating modes to more accurately control operation of engine 12.

In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 50 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in further detail below, ABS 113 may command an increased brake pressure at one or more wheels in order to prevent forward motion of the vehicle responsive to a slowing of the engine 12. Herein, increasing brake pressure at one or more wheels via ABS 113 may be referred to as activating, or applying one or more wheel brakes.

VSC 50 may receive an indication of an operator requested output of the vehicle propulsion system from a human operator 102, or an autonomous controller. For example, VSC 50 may receive sensory feedback from pedal position sensor 194 which communicates with pedal 192. Pedal 192 may refer schematically to an accelerator pedal. Similarly, VSC 50 may receive an indication of an operator requested vehicle braking via a human operator 102, or an autonomous controller. For example, VSC 50 may receive sensory feedback from pedal position sensor 157 which communicates with brake pedal 156. Braking of the vehicle may be carried out via friction braking (e.g. via wheel brakes 115) in response to a brake request from the human operator or autonomous controller and/or may be carried out by regenerative braking of the vehicle where the vehicle is slowed by converting its kinetic energy into a form (e.g. electrical energy) which may be used either immediately or stored (e.g. at battery 46) until needed. It may be understood that any one of first electric machine 40, second electric machine 14 and third electric machine 49 may be relied upon for converting vehicle kinetic energy into electrical energy as discussed above by operating the respective electric machine as a generator, as is understood in the art.

Third electric machine 49 may be in communication with rear axle 134 and rear wheels 130 via gear configuration (otherwise referred to as a rear final drive or rear differential) 126. In some examples, third electric machine 49 may be configured as what may be referred to as an electric rear axle device (ERAD) system. The ERAD system may include any suitable gearing to enable the third electric machine 49 to provide torque output to rear wheels 130. Thus, third electric machine 49 may selectively supply or absorb torque to rear axle 128 and rear wheels 130. In some examples, third electric machine 49 may be coupled directly to final drive 126.

In some examples, a third inverter 65 may be used to convert direct current (DC) derived from battery 46 to AC current for use via the third electric machine 49, and to convert AC current derived from third electric machine 49 operating as a generator to DC current for use by one or more of first electric machine 40 and second electric machine 14 and/or for storage at battery 46.

The system of FIG. 1 provides for a vehicle system, comprising: a first electric machine directly coupled to a second gearset; a second electric machine directly coupled to a planetary gearset, the planetary gearset directly coupled to the second gearset; an engine coupled to the planetary gearset; and a controller including executable instructions stored in non-transitory memory that cause the controller to increase torque output of the engine and decrease speed of the engine to maintain a constant engine power output while a requested engine power output is constant and while a temperature of the first electric machine is above a temperature at which an optimal speed of the engine is reduced. The vehicle system further comprises adjusting a speed of the engine as a function of a temperature of the first electric machine. The vehicle system further comprises adjusting a speed of the engine to a speed that minimizes torque of the first electric machine. The vehicle system includes where the speed that minimizes torque of the first electric machine is based on a present engine power request and a maximum engine torque at a present engine speed. The vehicle system further comprises additional instructions that cause the controller to reduce torque of the first electric machine while maintaining vehicle speed. The vehicle system further comprises additional instructions that cause the controller to reduce torque of the first electric machine while maintaining wheel torque. The vehicle system includes where the speed of the engine is decreased via adjusting a speed of the second electric machine.

Turning now to FIG. 2, an example prior art sequence for controlling a temperature of an electric machine (e.g., electric machine 40) is shown. The prior art method limits electric machine torque as a function of electric machine temperature to control the temperature rise of the electric machine. In particular, the electric machine torque limit is reduced as the electric machine temperature increases once the electric machine temperature reaches a threshold temperature. As the electric machine torque limit is reduced, the engine torque is increased to maintain the requested wheel torque. Initially, the engine speed is maintained and not increased but engine power is increased by increasing engine torque so that the requested torque may be generated by the engine. The increase in engine power is applied to charge the vehicle's traction battery. As the electric machine torque limit continues to decrease as electric machine temperature increases, the engine torque that is necessary to meet the request wheel torque may not be available at the present optimal engine speed, so engine speed may be increased to increase engine torque capacity. The excess engine power generated via operating the engine at the higher speed and torque is applied to charge the vehicle's battery. If the amount of charge stored in the battery reaches a threshold level (e.g., top of charge), the battery may no longer accept charge so the engine torque and speed are reduced. The reduction of engine speed and torque results in a loss of wheel torque and an inability to provide the requested wheel torque. In addition, since electric machine torque is constrained by electric machine temperature, the maximum wheel torque is reduced. The vertical lines at time t0-t2 represent times of interest in the sequence.

The first plot from the top of FIG. 2 is a plot of first electric machine temperature (e.g., a temperature of first electric machine 40) versus time. The vertical axis represents first electric machine temperature and first electric machine temperature increases in the direction of the vertical axis arrow. The horizontal axis represents time and time increases from the left side of the plot to the right side of the plot. Horizontal line 250 is an upper threshold. The first electric machine temperature begins to be controlled via adjusting electric machine torque when it exceeds threshold 250. Trace 202 represents the first electric machine temperature.

The second plot from the top of FIG. 2 is a plot of a wheel torque request versus time. The vertical axis represents wheel torque request and wheel torque request increases in the direction of the vertical axis arrow. The horizontal axis represents time and time increases from the left side of the plot to the right side of the plot. Trace 204 represents the wheel torque request. The wheel torque request may be made via a human driver applying an accelerator pedal. A position of the accelerator pedal and vehicle speed may be converted into a wheel torque request via a table or function that is referenced or indexed via accelerator pedal position and vehicle speed. The table or function outputs the wheel torque request.

The third plot from the top of FIG. 2 is a plot of a wheel torque versus time. The vertical axis represents wheel torque and wheel torque increases in the direction of the vertical axis arrow. The horizontal axis represents time and time increases from the left side of the plot to the right side of the plot. Trace 206 represents the wheel speed.

The fourth plot from the top of FIG. 2 is a plot of a wheel speed versus time. The vertical axis represents wheel speed and wheel speed increases in the direction of the vertical axis arrow. The horizontal axis represents time and time increases from the left side of the plot to the right side of the plot. Trace 208 represents the wheel speed.

The fifth plot from the top of FIG. 2 is a plot of an engine torque versus time. The vertical axis represents engine torque and engine torque increases in the direction of the vertical axis arrow. The horizontal axis represents time and time increases from the left side of the plot to the right side of the plot. Trace 210 represents the engine torque.

The sixth plot from the top of FIG. 2 is a plot of an engine speed versus time. The vertical axis represents engine speed and engine speed increases in the direction of the vertical axis arrow. The horizontal axis represents time and time increases from the left side of the plot to the right side of the plot. Trace 212 represents the engine speed.

The seventh plot from the top of FIG. 2 is a plot of an engine power versus time. The vertical axis represents engine power and engine power increases in the direction of the vertical axis arrow. The horizontal axis represents time and time increases from the left side of the plot to the right side of the plot. Trace 214 represents the engine power.

The eighth plot from the top of FIG. 2 is a plot of a first electric machine torque (e.g., a torque of first electric machine 40) versus time. The vertical axis represents first electric machine torque and first electric machine torque increases in the direction of the vertical axis arrow. The horizontal axis represents time and time increases from the left side of the plot to the right side of the plot. Trace 216 represents the electric machine torque.

The ninth plot from the top of FIG. 2 is a plot of a first electric machine speed (e.g., a speed of first electric machine 40) versus time. The vertical axis represents first electric machine speed and first electric machine speed increases in the direction of the vertical axis arrow. The horizontal axis represents time and time increases from the left side of the plot to the right side of the plot. Trace 218 represents the electric machine speed.

At time t0, electric machine temperature is less than threshold 250 and the wheel torque request is at a higher level. Wheel torque is at a higher level and wheel speed is at a medium level. Engine torque is at a higher level and engine speed is at higher level. Engine power is at a higher middle level. Electric machine torque is at a higher level and electric machine speed is at a middle level. Such conditions may be present when the hybrid vehicle is traveling on a road and the road has a positive grade. Alternatively, the conditions may be present when the hybrid vehicle may be towing a load.

Between time t0 and time t1, the temperature of the first electric machine increases. The first electric machine temperature approaches threshold 250 where regulation of first electric machine temperature begins. The first electric machine temperature may increase when the first electric machine is operated at higher first electric machine torque output levels for a long duration when cooling capacity of the first electric machine may not keep pace with heat output from the first electric machine. The other vehicle operating conditions remain unchanged and constant.

At time t1, first electric machine temperature exceeds threshold 250 and first electric machine torque is reduced in response to the first electric machine temperature. The first electric machine torque may be reduced via limiting first electric machine torque as a function of first electric machine temperature. The engine torque and engine speed are increased in response to the first electric machine temperature exceeding threshold 250 and the reduction in first electric machine torque output. By increasing engine torque and engine speed, engine power output is increased and wheel torque may be maintained at a constant level. The excess engine power is stored as electrical charge in the vehicle's battery. Alternatively, if the engine's excess power may not be stored in the vehicle's battery due to a high level of battery charge, engine power may be maintained at the level it was before time t1 by maintaining engine torque and engine speed at their levels just before time t1. However, wheel power may be reduced during such conditions. The wheel torque request remains constant and at its prior level, and the wheel torque matches the requested wheel torque. The wheel torque is unchanged because engine torque is increased to compensate for the reduction in electric machine torque. Wheel speed remains constant and at its previous level. The first electric machine speed remains at its prior level.

Between time t1 and time t2, the first electric machine temperature continues to increase and the first electric machine torque is reduced further to regulate the first electric machine's temperature. The engine torque is increased and the engine speed is also increased so that the engine power output is increased. First electric machine speed is unchanged. The wheel speed is unchanged since the wheel torque is unchanged.

At time t2, the temperature of the first electric machine levels off and the reduction of first electric machine torque ceases. The engine torque and speed are held at constant levels. The wheel torque request is unchanged and the wheel torque is unchanged. The wheel speed is also unchanged. First electric machine speed and wheel speed are unchanged. Engine power has leveled off at a higher level.

In this way, wheel torque may be maintained so that a vehicle does not decelerate if first electric machine temperature increases. However, engine power output is increased and the excess engine power needs to be stored as electric energy in an electric energy storage device. If the electric energy storage device is fully charged, then wheel torque may be reduced, thereby reducing vehicle speed in the presence of a constant wheel torque request. Thus, maintaining wheel torque may be a function of an amount of battery charge storage capacity that is not utilized. As the battery charge storage capacity is utilized, the possibility of reducing wheel torque may increase.

Referring now to FIG. 3, a vehicle operating sequence according to the method of FIG. 5 and the system of FIG. 1 is shown. The vehicle operating sequence of FIG. 3 may be provided via the hybrid vehicle shown in FIG. 1 in cooperation with the method of FIG. 5. The vertical lines at times t10-t12 represent times of interest in the sequence.

The first plot from the top of FIG. 3 is a plot of a temperature of a first electric machine 40 versus time. The vertical axis represents first electric machine temperature and first electric machine temperature increases in the direction of the vertical axis arrow. The horizontal axis represents time and time increases from the left side of the plot to the right side of the plot. Trace 302 represents the first electric machine temperature.

The second plot from the top of FIG. 3 is a plot of a wheel torque request versus time. The vertical axis represents wheel torque request and wheel torque request increases in the direction of the vertical axis arrow. The horizontal axis represents time and time increases from the left side of the plot to the right side of the plot. Trace 304 represents the wheel torque request.

The third plot from the top of FIG. 3 is a plot of a wheel torque versus time. The vertical axis represents wheel torque and wheel torque increases in the direction of the vertical axis arrow. The horizontal axis represents time and time increases from the left side of the plot to the right side of the plot. Trace 306 represents the wheel torque.

The fourth plot from the top of FIG. 3 is a plot of a wheel speed versus time. The vertical axis represents wheel speed and wheel speed increases in the direction of the vertical axis arrow. The horizontal axis represents time and time increases from the left side of the plot to the right side of the plot. Trace 308 represents the wheel speed.

The fifth plot from the top of FIG. 3 is a plot of an engine torque versus time. The vertical axis represents engine torque and engine torque increases in the direction of the vertical axis arrow. The horizontal axis represents time and time increases from the left side of the plot to the right side of the plot. Trace 310 represents the engine torque.

The sixth plot from the top of FIG. 3 is a plot of an engine speed versus time. The vertical axis represents engine speed and engine speed increases in the direction of the vertical axis arrow. The horizontal axis represents time and time increases from the left side of the plot to the right side of the plot. Trace 312 represents the engine speed.

The seventh plot from the top of FIG. 3 is a plot of an engine power versus time. The vertical axis represents engine power and engine power increases in the direction of the vertical axis arrow. The horizontal axis represents time and time increases from the left side of the plot to the right side of the plot. Trace 314 represents the engine power.

The eighth plot from the top of FIG. 3 is a plot of a first electric machine torque (e.g., torque of first electric machine 40) versus time. The vertical axis represents first electric machine torque and first electric machine torque increases in the direction of the vertical axis arrow. The horizontal axis represents time and time increases from the left side of the plot to the right side of the plot. Trace 316 represents the first electric machine torque.

The ninth plot from the top of FIG. 3 is a plot of a first electric machine speed (e.g., a speed of first electric machine 40) versus time. The vertical axis represents first electric machine speed and first electric machine speed increases in the direction of the vertical axis arrow. The horizontal axis represents time and time increases from the left side of the plot to the right side of the plot. Trace 318 represents the first electric machine speed.

At time t10, first electric machine temperature is a middle level and the wheel torque request is at a higher level. The wheel torque is at a higher level and it matches the wheel torque request. Wheel speed is at a medium level, engine torque is at a higher level, and engine speed is at higher level. Engine power is at a higher middle level. First electric machine torque is at a higher level and first electric machine speed is at a middle level. Such conditions may be present when the hybrid vehicle is traveling on a road and the road has a positive grade. Alternatively, the conditions may be present when the hybrid vehicle may be towing a load.

Between time t10 and time t11, the temperature of the first electric machine increases. The electric machine temperature may increase at higher first electric machine torque output levels when cooling capacity of the first electric machine cannot keep pace with heat output from the first electric machine. The other vehicle operating conditions remain unchanged and constant.

At time t11, the first electric machine temperature has increased to a threshold level. The requested or commanded engine speed is reduced according to the first electric machine temperature. The engine torque is increased in response to the requested or commanded engine speed. A reduction of torque of the first electric machine (e.g., 40) begins in response to the increase in engine torque. By increasing engine torque and reducing engine speed, engine power output may be maintained constant while the wheel torque request is constant. Further, there is no excess engine power due to the increase in the first electric machine temperature so that excess engine power does not have to be stored in the vehicle's battery. In addition, since engine torque is increased to maintain engine power, wheel torque is maintained constant while the requested wheel power is constant. The wheel torque is also constant while the requested wheel torque is constant.

Between time t11 and time t12, the first electric machine temperature continues to increase and the engine speed is reduced as the requested engine speed (not shown) is reduced in response to the increasing electric machine temperature. The engine torque is increased to maintain engine power and the torque output of the first electric machine is decreased further in response to the decreasing engine speed and the increasing engine torque. The wheel torque request remains constant along with wheel torque and wheel speed. The electric machine speed is also constant since wheel torque is unchanged as the temperature of the first electric machine increases.

At time t12, the temperature of the electric machine levels off and the reduction of engine speed ceases. The engine torque also stops increasing and the torque of the first electric machine ceases decreasing. The wheel torque request remains constant and the wheel torque and wheel speed remain unchanged. The electric machine speed remains constant and the engine power output remains constant.

In this way, wheel torque may be maintained so that a vehicle does not decelerate if electric machine temperature increases. In addition, engine power output may be maintained at a constant level when requested wheel torque is constant via increasing engine torque and decreasing engine speed. The wheel torque may also remain constant and the wheel speed may remain constant to provide the requested wheel power when engine speed is adjusted as a function of a temperature of the first electric machine 40.

Referring now to FIG. 4A, a plot 400 of a map or function 402 for determining requested or optimum engine speed according to a requested engine power is shown. The map or function 402 may be empirically or analytically determined, and it may be chosen to optimize vehicle objectives (e.g., engine noise, emissions, fuel consumption, etc.). In one example, the map may be determined via operating the engine on a dynamometer and adjusting engine speed and engine load for a requested engine power amount until a lowest engine fuel consumption amount for the requested engine power is observed. The map may be further modified responsive to electric machine losses and other vehicle performance metrics. The engine speed at which the requested engine power is generated by the engine while vehicle performance objectives are met is recorded.

Plot 400 includes a vertical axis that represents requested engine speed and the requested or optimal engine speed increases in the direction of the vertical arrow. The horizontal axis represents requested engine power and requested engine power increases in the direction of the horizontal axis arrow. The requested engine power may be determined via accelerator pedal position and vehicle speed. A maximum requested engine speed is indicated by horizontal dotted line 450. A maximum engine power is indicated by vertical dotted line 452. Solid line 402 represents a relationship between requested engine power and requested or optimal engine speed. In some examples, the map may also be indexed or referenced via additional parameters (e.g., vehicle speed, etc.).

Thus, for a given requested set of parameters including an engine power amount, only a single requested or optimized engine speed is generated. In addition, there is a unique requested or optimized engine speed for each requested engine power.

Turning now to FIG. 4B, a plot 470 of a map or function 475 for determining a requested maximum engine speed reduction according to a temperature of a first electric machine (e.g., 40 of FIG. 1) is shown. The map or function 475 may be empirically determined via operating the engine on a dynamometer and adjusting engine speed to a lowest value for the present requested engine power request where the engine operates without lugging or pre-ignition.

Plot 470 includes a vertical axis that represents maximum engine speed reduction amount (RPM) from the optimal engine speed (N_opt) and the maximum engine speed reduction amount increases in the direction of the vertical arrow. The horizontal axis represents a temperature of the first electric machine and temperature of the first electric machine increases in the direction of the horizontal axis arrow.

The maximum engine speed reduction may be determined via indexing or referencing function 475 via the present motor/generator temperature. For example, if the present first electric machine temperature is given via vertical line 472, then the corresponding maximum engine speed reduction is given by horizontal line 474, which intersects with vertical line 472 at function 475. Thus, for a given first electric machine temperature only a single maximum engine speed reduction value is generated.

Referring now to FIG. 5, a flow chart of a method 500 for operating a vehicle is shown. At least portions of method 500 may be implemented as executable controller instructions stored in non-transitory memory. Method 500 may operate in cooperation with the system of FIG. 1. Additionally, portions of method 500 may be actions taken in the physical world to transform an operating state of an actuator or device. The method of FIG. 5 may be incorporated into the system of FIG. 1 as executable instructions stored in non-transitory memory.

At 502, method 500 determines vehicle operating conditions. Vehicle operating conditions may include but are not limited to requested or desired wheel power, expected electrical power losses, accessory loads power, battery power, ambient temperature, present engine speed, and present first electric machine temperature. The vehicle operating conditions may be determined via the various sensors described herein. In one example, the requested wheel power may be determined via accelerator pedal position and vehicle speed. In particular, vehicle speed and accelerator pedal position are applied to reference a function of empirically determined wheel power request values. For each vehicle speed and accelerator pedal pair, there is a unique requested wheel power that is output via the function or table.

In addition, method 500 may determine various vehicle operating parameters from the vehicle operating conditions. For example, method 500 may determine a requested engine power via the following equation:

$$Peng\_req = Pwheel\_req + Plosses + Paccess - Pbattery$$

where Peng_req is the requested engine power, Pwheel_req is the requested wheel power, Plosses are expected electrical losses, Paccess is electrical accessory loads (e.g., steering, heating and air conditioning, etc.), and Pbattery (e.g., a requested battery charge or discharge power). Method 500 proceeds to 504.

At 504, method 500 determines an optimal engine speed (e.g., N_opt) from the engine power demand. In one example, method 500 indexes or references a table or function (e.g., See FIG. 4) according to the requested engine power and the table or function outputs the optimized engine speed for the requested engine power. Method 500 proceeds to 506.

At 506, method 500 determines an engine speed that minimizes first electric machine torque (e.g., electric machine 40 torque). In one example, the engine speed that minimizes first electric machine torque may be determined via the following equation:

$$N\_mot\_temp = \frac{Peng\_req}{Teng\_max}$$

where N_mot_temp is an engine speed that minimizes the first electric machine torque, Peng_req is the requested engine power, and Teng_max is the maximum engine torque at the present engine speed. Method 500 proceeds to 508.

At 508, method 500 determines maximum engine speed reduction from the optimal engine speed (N_opt) as a function of first electric machine temperature (e.g., a temperature of first electric machine 40). The maximum engine speed reduction may be determined via the following equation:

$$N\_delta = f(Motor\_Temp)$$

where N_delta is the maximum engine speed reduction from the optimal engine speed N_opt, f is a function that returns the maximum engine speed reduction N_delta, and motor_temp is an argument represents first electric machine temperature that is input to the function f. The function f may be of the form shown in FIG. 4B. Method 500 proceeds to 510.

At 510, method 500 determines and engine speed command and operates the engine at the commanded speed. In one example, the commanded engine speed may be determined via the following equation:

$$Ncmd\_eng = max(N\_mot\_temp, N\_opt - N\_delta)$$

where Ncmd_eng is the engine speed command value. The other parameters are as previously described. The engine may be operated at the commanded engine speed via adjusting speed of second electric machine 14 to a speed that is proportional to the requested engine speed. Method 500 operates the engine at the commanded engine speed. Method 500 also determines the requested engine torque via the following equation:

$$Teng\_req = \frac{Peng\_req}{Ncmd\_eng}$$

where Teng_req is the requested engine torque. The other parameters are as previously described. The engine torque is adjusted to the requested engine torque via adjusting an engine torque actuator (e.g., throttle, fuel injector, spark timing, etc.). The torque of first electric machine 40 is adjusted so that when the engine torque and the torque of the second electric machine 14, which controls engine speed, is combined with the torque of the first electric machine 40, the requested wheel torque is provided. The requested wheel torque may be determined via the following equation:

$$Twheel\_req = \frac{Pwheel\_req}{Nwheel}$$

where Twheel_req is the requested wheel torque, Pwheel_req is the requested wheel power, and Nwheel is the present wheel speed. The torque of the first electric machine may be solved via the following equation:

$$GR2 \cdot Mot\_gen1\_tor = Twheel - GR1 \cdot Tring$$

where Twheel is the torque at the vehicle's wheels (e.g., 36), GR1 is a gear ratio between the ring gear and the wheels including any final drive ratio, Tring is ring gear torque which depends on the reaction torque provided by the second electric machine 14, which in turn depends on the engine torque and the amount by which commanded engine speed changes, and GR2 is a gear ratio between the first motor/generator 40 and the wheels, and Mot_gen1 tor is the torque of the first electric machine 40. Method 500 proceeds to exit.

In this way, the commanded engine speed may be a function of a temperature of the first electric machine 40. As the temperature of the first electric machine 40 increases, an optimal engine speed may be reduced and engine torque may be increased so that requested engine power is met. The engine output power amount may remain unchanged for a constant wheel power request when the temperature of the first electric machine 40 increases so that there is no need to store additional engine power to the vehicle's battery. This may allow the vehicle's powertrain to remain with constant engine power output as long as the requested wheel power is constant. In addition, the present method does not limit a maximum torque of the first motor/generator 40 as a function of temperature of first electric machine 40 so that the first motor/generator 40 may deliver its full torque capacity at the first electric machine's present speed if such operation is requested via the vehicle's human driver.

Thus, the method of FIG. 5 provides for a method for operating a vehicle driveline, comprising: adjusting a speed of an engine via a controller from an optimal engine speed to a speed that is a function of a temperature of a first electric machine. The method includes where the optimal engine speed is an engine speed at which engine fuel consumption is a lowest amount for an engine power request. The method includes where adjusting the speed of the engine includes reducing the speed of the engine. The method further comprises increasing torque output of the engine while adjusting the speed of the engine so as to maintain engine power output when a requested engine power is constant. The method includes where the speed of the engine is adjusted via adjusting a speed of a second electric machine. The method includes where the first electric machine is directly coupled to a transaxle and where the second electric machine is directly coupled to a planetary gearset. The method includes where the planetary gearset is directly coupled to the transaxle.

The method of FIG. 5 also provides for a method for operating a vehicle driveline, comprising: adjusting engine operation to minimize a torque of a first electric machine while maintaining engine power and wheel torque via a controller. The method includes where the speed of the engine is adjusted via adjusting a speed of a second electric machine. The method includes where adjusting the torque of the engine includes increasing a torque of the engine as a temperature of the first electric machine increases. The method includes where adjusting the speed of the engine includes reducing the speed of the engine. The method includes where adjusting the torque of the engine based on the requested engine power includes dividing the requested engine power by the adjusted speed of the engine. The method includes where the first electric machine is directly coupled to a transaxle.

In another representation, the method of FIG. 5 provides for a method for operating a vehicle driveline, comprising: adjusting a speed of an engine via a controller to a speed of the engine that minimizes torque of the first electric machine while maintaining a substantially constant wheel torque (e.g., wheel torque that vary less than 5% from an average wheel torque). The method includes where the engine torque is adjusted based on the adjusted engine speed to maintain engine power equal to engine power just before a time the speed of the engine is adjusted. The method includes maintaining a wheel power in response to a constant wheel power while adjusting the speed of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle driveline, comprising: adjusting a speed of an engine via a controller from an optimal engine speed to an engine speed that is a function of a temperature of a first electric machine, where the speed of the engine is adjusted via adjusting a second electric machine to an electric machine speed that is proportional to the engine speed that is a function of the temperature of the first electric machine.

2. The method of claim 1, where the optimal engine speed is an engine speed at which engine fuel consumption is a lowest amount for an engine power request.

3. The method of claim 1, where adjusting the speed of the engine includes reducing the speed of the engine.

4. The method of claim 1, further comprising increasing torque output of the engine while adjusting the speed of the engine so as to maintain engine power output when a requested engine power is constant.

5. The method of claim 1, where the speed that is a function of the temperature of the first electric machine is determined by subtracting a maximum speed reduction speed value from an optimal engine speed.

6. The method of claim 5, where the first electric machine is directly coupled to a transaxle and where the second electric machine is directly coupled to a planetary gearset.

7. The method of claim 6, where the planetary gearset is directly coupled to the transaxle.

8. A vehicle system, comprising:
a first electric machine directly coupled to a second gearset;
a second electric machine directly coupled to a planetary gearset, the planetary gearset directly coupled to the second gearset;
an engine directly coupled to the planetary gearset; and
a controller including executable instructions stored in non-transitory memory that cause the controller to increase torque output of the engine and decrease a speed of the engine to maintain a constant engine power output while a requested engine power output is constant and while a temperature of the first electric machine is above a temperature at which an optimal speed of the engine is reduced, where the speed of the engine is decreased via adjusting the second electric machine to an electric machine speed that is proportional to a speed that is a function of the temperature of the first electric machine.

9. The vehicle system of claim 8, further comprising adjusting a speed of the engine as a function of a temperature of the first electric machine.

10. The vehicle system of claim 8, further comprising adjusting a speed of the engine to a speed that minimizes torque of the first electric machine.

11. The vehicle system of claim 10, where the speed that minimizes torque of the first electric machine is based on a present engine power request and a maximum engine torque at a present engine speed.

12. The vehicle system of claim 8, further comprising additional instructions that cause the controller to adjust a position of a throttle to increase torque output of the engine.

13. The vehicle system of claim 8, further comprising additional instructions that cause the controller to reduce torque of the first electric machine while maintaining wheel torque.

14. The vehicle system of claim 8, where the speed that is the function of the temperature of the first electric machine is determined by subtracting a maximum speed reduction speed value from an optimal engine speed.

* * * * *